C. F. HAUG & H. E. MAGNUSON.
STARCH MOLD.
APPLICATION FILED FEB. 10, 1915.
1,162,771.
Patented Dec. 7, 1915.
2 SHEETS—SHEET 1.
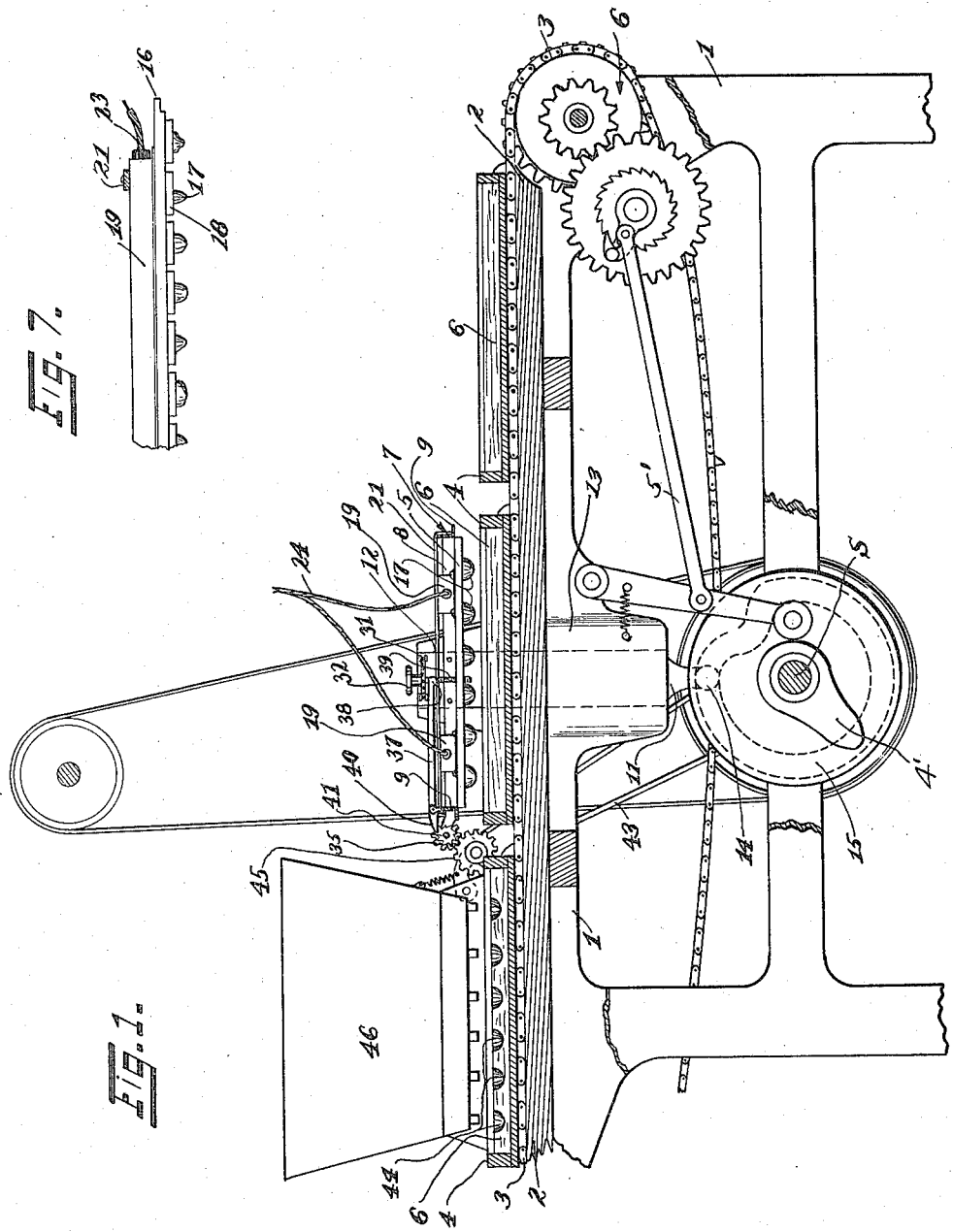
Witnesses:
Chas E Whiteman
H. D. Penney
Inventors:
Charles F. Haug,
Hugo E. Magnuson,
By their Atty:

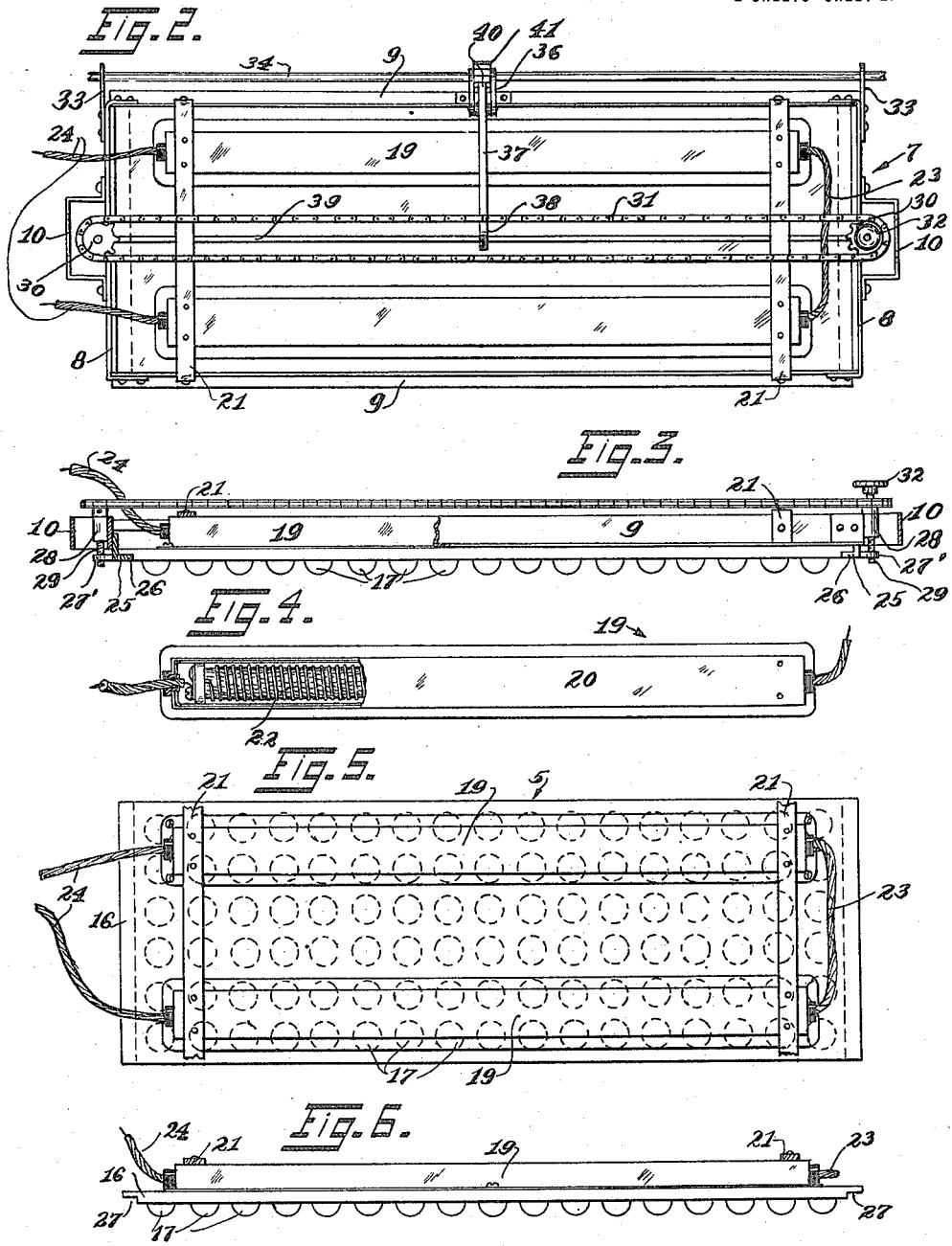

UNITED STATES PATENT OFFICE.

CHARLES F. HAUG AND HUGO E. MAGNUSON, OF BROOKLYN, NEW YORK.

STARCH-MOLD.

1,162,771.  Specification of Letters Patent.  Patented Dec. 7, 1915.

Application filed February 10, 1915. Serial No. 7,226.

*To all whom it may concern:*

Be it known that we, CHARLES F. HAUG, a citizen of the United States, residing at Brooklyn, in the county of Kings and State of New York, and HUGO E. MAGNUSON, a citizen of the United States, residing at Brooklyn, in the county of Kings and State of New York, have invented certain new and useful Improvements in Starch-Molds, of which the following is a specification.

This invention relates to the general art of starch mold apparatus for molding candy, and more especially to starch mold apparatus in which molds are reciprocated into and out of contact with trays containing starch to form depressions in such starch.

The main object of the present invention is to provide a mold board which is composed of suitable heat conducting substance, and to provide means for heating such mold board so that the mold board when coming in contact with the starch will heat the starch and dry the same.

According to the present practice, the starch before being used in the mold must be properly dried which is generally accomplished in a separate drying room.

One of the features of the present invention is therefore the simultaneous drying of the starch and forming of the depressions.

It has also been found that certain candy substance will harden before it has properly conformed to the depression formed in the starch which is due to the fact that the cool starch chills the candy substance and then quickly coagulates the same.

It is therefore another feature of the present invention to form the depressions in the starch and simultaneously therewith to heat the starch to maintain such sensitive candy substance in moldable state sufficiently long to permit it to conform to the depressions formed in the starch.

Another object of the invention is to provide a mold base board composed of suitable heat conducting substance to which mold strips are attached which latter are also composed of heat conducting substance and to provide heating means in a position adjacent to such base board which latter when heated by such heating means will in turn heat the mold strips.

Still another object of the invention is to provide an arrangement for electrically heating such a mold board or mold base board.

These and other features, capabilities and advantages of the invention will appear from the subjoined detailed description of one specific embodiment thereof illustrated in the accompanying drawings in which—

Figure 1 shows an apparatus partly in section equipped with the improved heating arrangement. Fig. 2 is a plan view of the mold supporting frame with the mold board secured in place. Fig. 3 is a side view of the same partly broken away. Fig. 4 is a plan view of one of the heaters for the mold board partly broken away to show the interior thereof. Fig. 5 is a plan view of the mold board and heating means, the mold supporting frame being broken off. Fig. 6 is a side view of the mold board and heating means shown in Fig. 5. Fig. 7 is a fragmentary view in side elevation showing a mold board provided with detachable mold strips, the heating means being shown in place.

In the embodiment shown in Fig. 1, there is illustrated one system with which the improved heating mold board can be used, in which system there is provided a main frame 1, having a conveyer guideway 2 in which a conveyer 3 travels being intermittently actuated by the cam 4' coacting with the links 5' and gearing 6, the cam 4' being mounted on a shaft S driven by belt from any suitable source of power. On the conveyer 3 are suitably supported trays 4 which are adjusted in their movement so that when they arrive under the mold board 5 they will register with, and come to rest in such registering position until a mold board 5 had descended and impressed its molds into the starch 6 contained in the registering tray 4.

The mold board 5 is mounted in a suitable frame 7 which is mainly composed of two end bars 8, 8 suitably attached to two angle bars 9, 9 forming the side bars of the frame. Each of the end bars 8 is provided with a bracket 10 on the outside of which a slide 11 may be detachably secured in any suitable manner. Each of the slides 11 (only one being shown in Fig. 1) is slidably mounted in a guideway 12 formed in a boss 13 of the main frame 1, the lower end 14 of each slide 11 being operatively connected with a cam guideway 15 formed in a wheel mounted on and driven by said shaft S, by means of which connection the slides 11 are intermittently descended to press the mold board 5 into the starch 6 of a tray 4 and then again return to raised position.

The mold board 5, as particularly shown in Figs. 5 and 6, comprises essentially a mold base board 16, preferably composed of a substance having a high rate of heat conductivity such as aluminum on one side of which board 16 there are provided a series of mold conformations 17 which may be either integral with a board or otherwise attached thereto. In the form illustrated in Fig. 7, the mold conformations 17 are positioned on strips 18 also composed of a substance such as aluminum, there being a row of such mold conformations 17 on each strip 18, which strips are secured transversely across the mold board 5. On the other side of the mold base board 16, the heating means are provided by means of which, the mold base board 16 is heated and the heat in turn conducted to and through the mold conformations 17. In the present instance, the heating means comprise two electric heaters 19, 19 each comprising a casing 20 having brackets 21 fastening such heaters to the side bars 9. In these casings 20, there are positioned heating coils 22 (Fig. 4) which are connected in series by the cable 23 and by the lead and return cables 24 to any suitable source of electric power. Adjacent to the inner side of each of the end bars 8, 8, there is provided an angle bar 25 having a ledge 26 to engage in the seat formed by the recess 27 at each of the ends of the mold base board 16. Each of these angle bars 25 is provided with an outwardly extending lug 27' which has a screw opening in alinement with a screw opening formed in a boss 28 formed on the outer end of the adjacent end bar 8 through which passes a screw 29 provided with a sprocket wheel 30 at its upper end. The two sprockets 30 of the screws 29 are connected to one another by the sprocket chain 31, and one of the screws 29 in the present instance the one shown at the right of Figs. 2 and 3 is provided with a hand wheel 32 whereby such screw 29 may be turned and with it the other screw 29 by means of the sprocket chain 31. These screws by means of their connection with the lugs 27 will simultaneously raise or lower both angle bars 25. Thus when the mold base board is positioned on the ledge 26, the depth to which the molds are to be impressed in the starch 6 may be conveniently adjusted.

At each end of one of the side bars 9 there is formed an outwardly extending bracket 33 to receive a shaft 34 provided at one end with a gear 35. Substantially at the middle of such side bar 9 there is provided a bearing bracket 36 in which a hammer 37 is fulcrumed, one end 38 of which hammer extends over approximately the middle of the mold base board to engage the cross bar 39 extending across the mold base board and secured at its ends to the end bars 8, 8. The other end 40 of the hammer 37 extends across the shaft 34 into engagement with a star wheel 41 secured to such shaft 34.

In the path of movement of the gear 35, there is provided a yieldingly mounted gear 45 constantly driven from shaft S by means of belt 43. The yieldingly mounted gear 45 will engage the gear 35 just after the mold board 5 has engaged the starch 6 but not while the mold board is positioned in contact with the starch 6. By such arrangement, the star wheel 41 will be rotated which actuates the hammer 37 and the latter in turn strikes the cross bar 39 thereby vibrating the mold board 5 to loosen any starch that might cling to the mold conformations 17 after the mold bar 5 has been raised out of contact with such starch 6.

The tray 4 which has been treated by the mold board 5 and received the depressions 44 (Fig. 1) in its starch 6, is then advanced under the filling hopper 46 where these depressions will be filled with candy substance in the usual manner.

From the foregoing it will be seen that, should any of the starch 6 be still moist before being molded, the hot mold conformations 17 coming into contact with the same will quickly dry it.

It will also be seen that the starch 6 by still retaining its heat from such mold conformations after having arrived under the filling hopper 46, when the candy substance which is poured into the depressions is of the quickly hardening variety, the heat of the starch will operate to maintain the candy substance in a condition sufficiently yieldable so that it will completely conform to the depression in the starch 6.

It is obvious that various changes and modifications may be made to the details of construction without departing from the general spirit of the invention.

We claim:

1. In combination with a conveyer, trays containing starch carried by said conveyer, and a frame slidably mounted above said conveyer, of a mold board supported in said frame to descend into said trays as they pass beneath it, and means for heating said mold board.

2. In combination with a conveyer, trays containing starch carried by said conveyer, and a frame slidably mounted above said conveyer, of a metal mold board supported in said frame to descend into said trays as they pass beneath it, and means for heating said mold board.

3. In combination with a conveyer, trays containing starch carried by said conveyer, and a frame slidably mounted above said conveyer, of an aluminum mold board supported in said frame to descend into said trays as they pass beneath it, and means for heating said mold board.

4. In combination with a tray containing starch and a frame slidably mounted above said tray, of a mold board supported in said frame to descend into said tray, and means for heating said mold board.

5. In combination with a tray containing starch and a frame slidably mounted above said tray, of a metal mold board supported in said frame to descend into said tray, and electric heating coils disposed adjacent to said mold board for heating the same.

6. In combination with a tray containing starch and a frame slidably mounted above said tray, of ledges along the inner end walls of said frame, a metal mold board supported on said ledges, heating means attached to said frame adjacent to said mold board for heating the same, and means for adjusting the vertical position of said mold board in said frame.

7. In combination with a tray containing starch, of a mold adapted to be impressed into the starch in said tray, said mold comprising a mold base board, mold conformations on said base board, and heating means disposed adjacent to said base board for heating said base board and thereby heating said mold conformations.

8. In combination with a tray containing starch, of a mold adapted to be impressed into the starch in said tray, said mold comprising a metal base board, mold conformations on one side of said base board, casings disposed adjacent to the other side of said base board, electric heating coils in said casings, and electric connections for passing a current through said heating coils, said coils heating said base board which in turn will heat said mold conformations.

9. In combination with a tray containing starch and a frame slidably mounted above said tray, of a mold base board detachably secured to said frame, mold conformations on one side of said base board, casings, brackets attaching said casings to said frame adjacent to the other side of said base board, electric heating coils in said casings, and electric connections for passing current through said heating coils, said coils heating said base board which in turn will heat said mold conformations.

10. In combination with a tray containing starch, of a mold adapted to be impressed into the starch in said tray, said mold comprising a metal base board, strips having mold conformations secured on one side of said base board, electric heating coils disposed adjacent to the other side of said base board, and electric connections for passing current through said heating coils, said coils heating said base board which in turn will heat said strips.

11. In combination with a tray containing starch, of a mold adapted to be impressed into the starch in said tray, said mold comprising an aluminum base board, mold conformations on one side of said base board, and heating means disposed adjacent to the other side of said base board for heating said base board which in turn will heat said mold conformations.

12. In combination with a tray containing starch, of a mold adapted to be impressed into the starch in said tray, said mold comprising an aluminum base board, aluminum strips having mold conformations secured on one side of said base board, electric heating coils disposed adjacent to the other side of said base board, and electric connections for passing current through said heating coils, said coils heating said base board which in turn will heat said strips.

13. In combination with a tray containing starch, of a mold adapted to be impressed into the starch in said tray, said mold comprising a base board composed of a heat conducting substance, mold conformations on one side of said base board, and heating means disposed adjacent to the other side of said base board for heating said base board which in turn will heat said mold conformations.

14. In combination with a tray containing starch, of a mold adapted to be impressed into the starch in said tray, said mold comprising a base board composed of a heat conducting substance, strips also composed of a heat conducting substance on one side of said base board, and heating means disposed adjacent to the other side of said base board for heating said base board which in turn will heat said mold conformations.

CHARLES F. HAUG.
HUGO E. MAGNUSON.

Witnesses:
GUSTAV DREWS,
H. D. PENNEY.

Copies of this patent may be obtained for five cents each, by addressing the "Commissioner of Patents, Washington, D. C."